US009227676B2

(12) United States Patent
Moessner

(10) Patent No.: US 9,227,676 B2
(45) Date of Patent: Jan. 5, 2016

(54) REAR SPOILER ARRANGEMENT FOR MOTOR VEHICLE

(71) Applicant: Dr. Ing. h.c. F. Porsche Aktiengesellschaft, Stuttgart (DE)

(72) Inventor: Malte Moessner, Boeblingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/327,977

(22) Filed: Jul. 10, 2014

(65) Prior Publication Data

US 2015/0016131 A1 Jan. 15, 2015

(30) Foreign Application Priority Data

Jul. 11, 2013 (DE) .......................... 10 2013 107 366

(51) Int. Cl.
*B62D 35/00* (2006.01)
*F21S 8/10* (2006.01)
*B62D 37/02* (2006.01)
*B60Q 1/00* (2006.01)
*B60Q 1/26* (2006.01)

(52) U.S. Cl.
CPC ............ *B62D 35/007* (2013.01); *B60Q 1/0035* (2013.01); *B60Q 1/26* (2013.01); *B62D 37/02* (2013.01); *F21S 48/20* (2013.01)

(58) Field of Classification Search
CPC .... B62D 35/007; B62D 37/02; B60Q 1/0035; B60Q 1/26; F21S 48/20
See application file for complete search history.

(56) References Cited

U.S. PATENT DOCUMENTS

| 5,923,245 | A | * | 7/1999 | Klatt et al. ..................... 340/479 |
| 2009/0160213 | A1 | * | 6/2009 | Paul et al. ................. 296/180.1 |
| 2012/0292945 | A1 | | 11/2012 | Nusbaum | |
| 2013/0088595 | A1 | | 4/2013 | Nauert | |
| 2015/0136549 | A1 | | 5/2015 | Patterson et al. | |

FOREIGN PATENT DOCUMENTS

| DE | 30 03 565 | 8/1981 |
| DE | 102008011179 | 8/2009 |
| EP | 1582444 | 10/2005 |
| EP | 2511162 | 11/2013 |
| FR | 2713581 | 6/1995 |
| GB | 2473293 | 3/2011 |
| JP | S 61160330 | 7/1986 |

(Continued)

OTHER PUBLICATIONS

British Appl. No. GB 1411973.9—Combined Search and Examination Report issued Jan. 6, 2015.

(Continued)

*Primary Examiner* — Anne Hines
(74) *Attorney, Agent, or Firm* — Gerald E. Hespos; Michael J. Porco; Matthew T. Hespos

(57) ABSTRACT

A rear spoiler arrangement (2) for a vehicle has at least one rear spoiler (6), that can be moved in the vertical direction of the vehicle between a rest position and a functional position. The rear spoiler arrangement (2) is placed on a rear spoiler support (5) and substantially follows the shape profile in the rear area of the vehicle body when the rear spoiler arrangement (2) is in the rest position. Rear light units (4) of the vehicle are integrated into lateral end regions (3) of the rear spoiler support (5) and/or of the rear spoiler (6).

5 Claims, 2 Drawing Sheets

(56) References Cited

FOREIGN PATENT DOCUMENTS

| | | |
|---|---|---|
| JP | H0249634 | 4/1990 |
| JP | H07117733 | 5/1995 |

OTHER PUBLICATIONS

British Patent Appl. No. GB 1411973.9—Examination Report issued Jul. 6, 2015.

* cited by examiner

REAR SPOILER ARRANGEMENT FOR MOTOR VEHICLE

CROSS REFERENCE TO RELATED APPLICATION

This application claims priority under 35 USC 119 to German Patent Appl. No. 10 2013 107 366.2 filed on Jul. 11, 2013, the entire disclosure of which is incorporated herein by reference.

BACKGROUND

1. Field of the Invention

The invention relates to a rear spoiler arrangement for motor vehicles having at least one rear spoiler that can be moved in the vertical direction of the vehicle between a rest position and a functional position and in the rest position substantially follows the shape profile in the rear area of the vehicle body.

2. Description of the Related Art

Motor vehicles often are fit with "spoilers" in the rear area to enlarge the aerodynamically effective area of the motor vehicle and hence to achieve a higher contact pressure with the roadway. Rigid spoiler arrangements and spoiler arrangements in which the rear spoiler can be moved out of a rest position into a functional position are known from the prior art. The movement of the spoiler normally is performed by electric motor using mechanical adjusting devices and/or hydraulically and/or pneumatically.

DE 10 2008 011 179 A1, EP 2 511 162 A, U.S. Pat. No. 424,999 S and U.S. 647,432 S also disclose rear spoiler arrangements in which rear lights in the rear area of a motor vehicle substantially match the region of transition of the spoiler into the rear portion of the body.

It is the aim of aerodynamic engineers to fit the rear spoilers into the body as unobtrusively as possible and, on the other hand, to arrange the rear spoiler over as much of the width of the vehicle as possible.

Accordingly, an object of the invention is to provide a large-area spoiler arrangement that can fits functionally and visually into the rear area of a motor vehicle.

SUMMARY OF THE INVENTION

The invention relates to a rear spoiler arrangement where the rear spoiler, in the rest position, can be placed on a rear spoiler support. Additionally, rear light units of the vehicle are integrated into lateral end regions of the rear spoiler support and/or of the rear spoiler. More particularly, parts of the light unit for the rear area of a motor vehicle preferably are arranged in a manner integrated into the lateral end regions of the rear spoiler support and also of the rear spoiler.

Ideally, the rear light units are designed substantially to match the contour profile of the rear spoiler and/or of the rear spoiler support, thus ensuring, on the one hand, that they fit harmoniously into this area of the rear of a motor vehicle and, on the other hand, that they support the functionality of the spoiler.

A preferred illustrative embodiment of the subject matter of the invention is shown in the figures of the drawing. By means of this illustrative embodiment, details and features of the invention are explained in greater detail below.

DETAILED DESCRIPTION OF THE PREFERRED EMBODIMENTS

The rear area 1 of a motor vehicle has a rear spoiler arrangement 2 arranged over substantially the entire width of the motor vehicle. The lateral end regions 3 of the rear area 1 of the vehicle comprise a rear light unit 4 that may comprise lighting elements for tail lighting, brake lighting, flashers, rear fog lighting etc. The external contours of the rear light unit 4 are matched to the rear spoiler arrangement 2 in this lateral end region 3—apart from the surface shapes specific to the lights.

Figure 1:
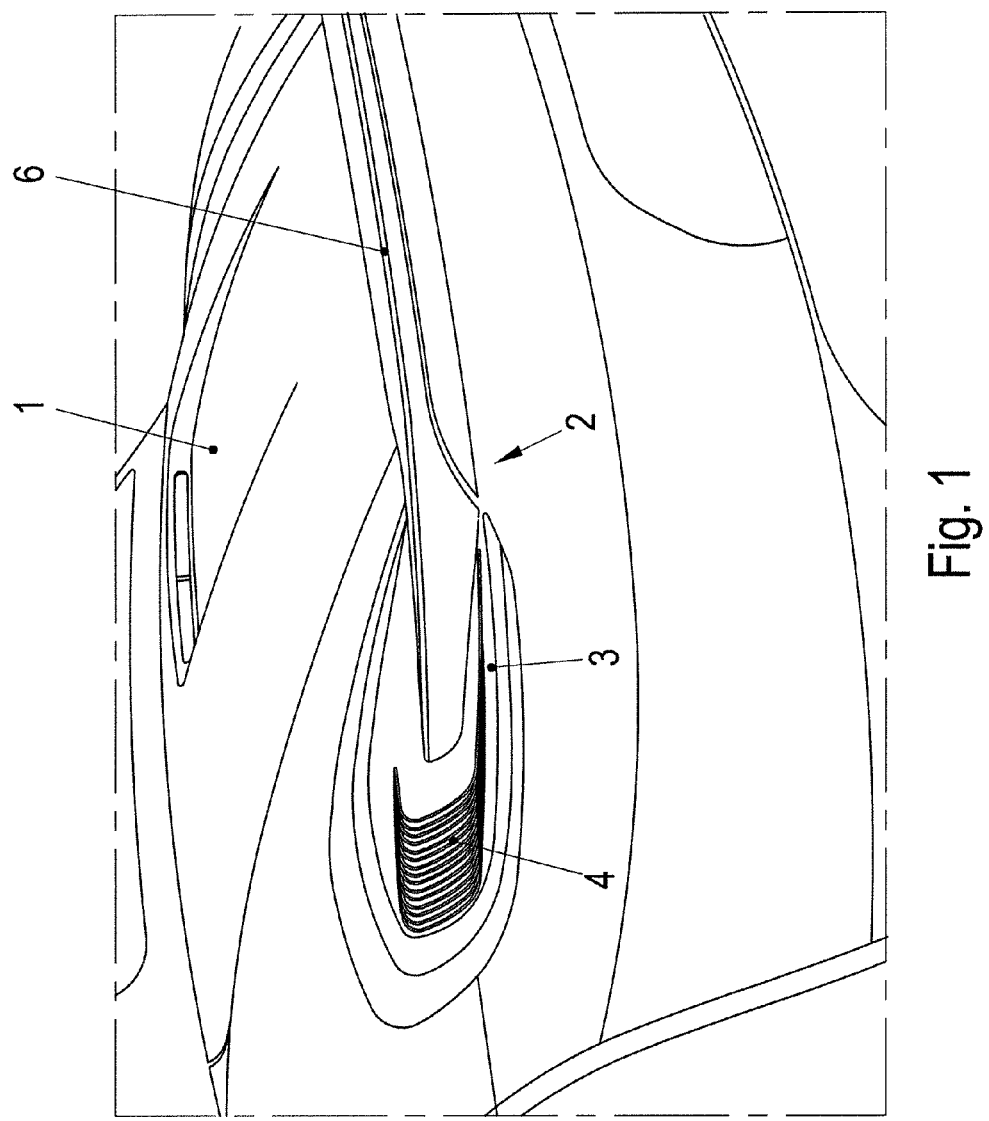
FIG. 1 shows a rear spoiler arrangement according to the invention in the rest position.
Figure 2:
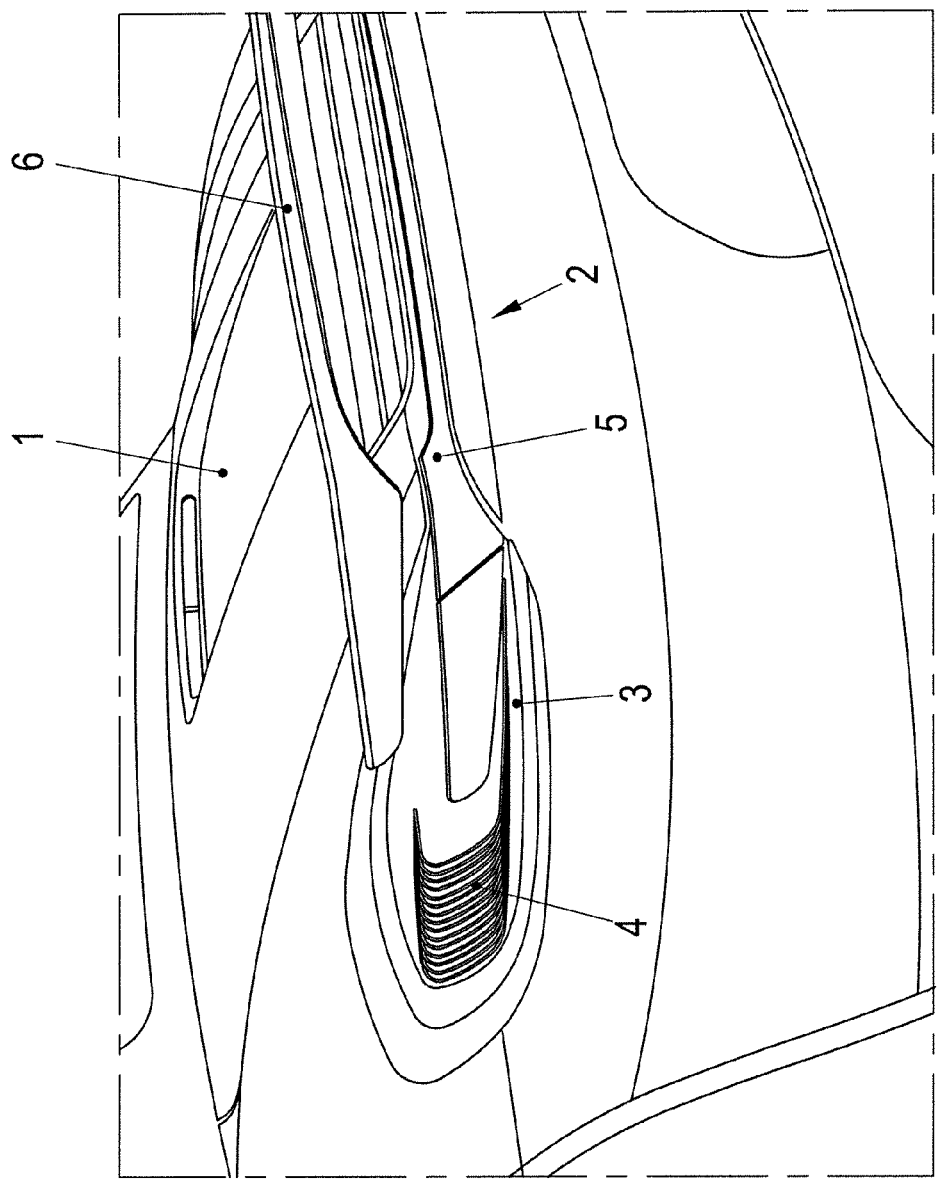
FIG. 2 shows the rear spoiler arrangement according to FIG. 1 in a functional position.

The rear spoiler arrangement 2 is shown in the rest position in FIG. 1 and in the functional position in FIG. 2. The rear spoiler arrangement 2 comprises a rear spoiler support 5 that is fit largely into the contour profile of the rear area 1 of the vehicle. The rear spoiler arrangement 2 further includes the actual rear spoiler 6 that can be placed and supported on the rear spoiler support 5 in the rest position of FIG. 1. In the illustrated embodiment shown, the rear light unit 4 is integrated into the lateral end regions 3 of the rear spoiler support 5 at both ends and is matched to the shape profile.

The rear light unit 4 can also be accommodated exclusively in the movable spoiler 6, in the corresponding end region thereof, in an appropriately matched way. Similarly, parts of the rear light unit 4 can be arranged in the lateral end region 3 of the rear spoiler support 5 and other parts can be arranged in the lateral end region of the rear spoiler 6.

The movement of the rear spoiler 6 is accomplished electromechanically and/or hydraulically and/or pneumatically in a known manner.

What is claimed is:

1. A rear spoiler arrangement for a vehicle, comprising:
   at least one rear spoiler that can be moved in the vertical direction of the vehicle between a rest position and a functional position, the rear spoiler having at least one lateral end and being configured for substantially following a shape profile of a rear area of the vehicle body when the rear spoiler is in the rest position;
   a rear spoiler support on which the rear spoiler is placed and supported when the rear spoiler is in the rest position, the rear spoiler support having at least one lateral end region adjacent the respective at least one lateral end of the rear spoiler; and
   at least one rear light unit of the vehicle integrated respectively into the at least one lateral end region of the rear spoiler support, a side of the at least one rear light unit facing the rear spoiler being concave and being disposed so that the at least one end of the rear spoiler nests in the concave side of the at least one rear light unit when the rear spoiler is in the rest position, and the at least one rear light unit being disposed and configured to be visible when the rear spoiler is in the rest position and when the rear spoiler is in the functional position.

2. The rear spoiler arrangement of claim 1, wherein a part of the at least one rear light unit further is integrated into the at least one lateral end region of the rear spoiler.

3. The rear spoiler arrangement of claim 1, wherein the rear light unit substantially matches the contour profile of at least one of the rear area of the vehicle, the rear spoiler and the rear spoiler support.

4. A motor vehicle, comprising:
   a rear area;

a rear spoiler support at the rear area and having left and right lateral end regions;

a rear spoiler that can be moved between a functional position where the rear spoiler is spaced above the rear spoiler support and a rest position where the rear spoiler substantially abuts the rear spoiler support, the rear spoiler having left and right lateral ends nested respectively with the left and right lateral end regions of the rear spoiler support and with the rear spoiler substantially following a shape profile of the rear area of the motor vehicle;

left and right rear light units integrated respectively into the left and right lateral end regions of the rear spoiler support adjacent to the rear spoiler when the rear spoiler is in the rest position, sides of the left and right rear light units facing the rear spoiler being concave and being disposed so that the left and right ends of the rear spoiler nest in the concave sides of the left and right rear light units when the rear spoiler is in the rest position, and the left and right rear light units being disposed and configured to be visible when the rear spoiler is in the rest position and when the rear spoiler is in the functional position.

5. The motor vehicle of claim 4, further comprising rear lights integrated into lateral ends of the rear spoiler that are nested with the lateral end regions of the rear spoiler support.

* * * * *